United States Patent

[11] 3,633,441

| [72] | Inventor | Raymond John Hicks |
| | | Llanwrthwl, Wales |
| [21] | Appl. No. | 24,770 |
| [22] | Filed | Apr. 1, 1970 |
| [45] | Patented | Jan. 11, 1972 |
| [73] | Assignee | Vickers Limited |
| | | London, England |
| [32] | Priority | Apr. 18, 1969 |
| [33] | | Great Britain |
| [31] | | 19,893/69 |

[54] GEAR TRAINS
3 Claims, 3 Drawing Figs.

[52] U.S. Cl. ................................................ 74/801,
74/410, 74/411
[51] Int. Cl. ..................................... F16h 1/28,
F16h 57/00
[50] Field of Search ........................................ 74/801,
410, 411

[56] References Cited
UNITED STATES PATENTS

| 137,267 | 3/1873 | Webster et al. | 74/801 |
| 2,936,655 | 5/1960 | Peterson et al. | 74/801 |
| 2,944,444 | 7/1960 | Burns | 74/801 |
| 3,258,995 | 7/1966 | Bennett et al. | 74/801 |
| 3,425,301 | 2/1969 | Shannon | 74/801 |
| 3,434,374 | 3/1969 | Barwig et al. | 74/801 |

*Primary Examiner*—Arthur T. McKeon
*Attorney*—Waters, Roditi, Schwartz & Nissen ABSTRACT: An epicyclic gear train of the type where the planets, instead of being mounted on the spindles of a carrier, float between the annulus and sun gear and also mesh with toothed reaction rings. The latter are resiliently mounted and arranged to have limited freedom of rotational movement about the axis of the gear to ensure even load sharing in the gear.

GEAR TRAINS

This invention relates to epicyclic gear trains.

It is customary in epicyclic gearing to have the planets mounted on a carrier that may or may not rotate. This carrier is usually of massive construction and the planets are mounted on rigid spindles fixed to the carrier. It has been proposed to have a resilient spindle arrangement which ensures sharing of the transmitted load between each of the planet wheels meshed with the common sun wheel and the surrounding annulus gear. An additional advantage of this is that extremely accurate machining is not essential, i.e., the permissible tolerances are increased, for the flexibility of the spindles allows the planets to locate themselves with uniform loading. It has also been proposed to dispense with carriers having spindles and instead provide fixed annular rings, internally toothed, with which elongated planets also mesh.

According to the present invention there is provided an epicyclic gear train wherein each planet gear is floatably mounted between the sun and annulus, and wherein a toothed reaction structure is provided with which each planet gear also meshes, the engagement of the annulus and of the reaction structure with each planet gear being balanced and in the same radial plane through the axis of the epicyclic gear train, and said reaction structure being mounted by resilient flexible means that permits the reaction structure limited rotational movement about said axis.

For a better understanding of the invention and to show how the same may be carried into effect, reference will now be made, by way of example, to the accompanying drawings, in which.

Figure 1:
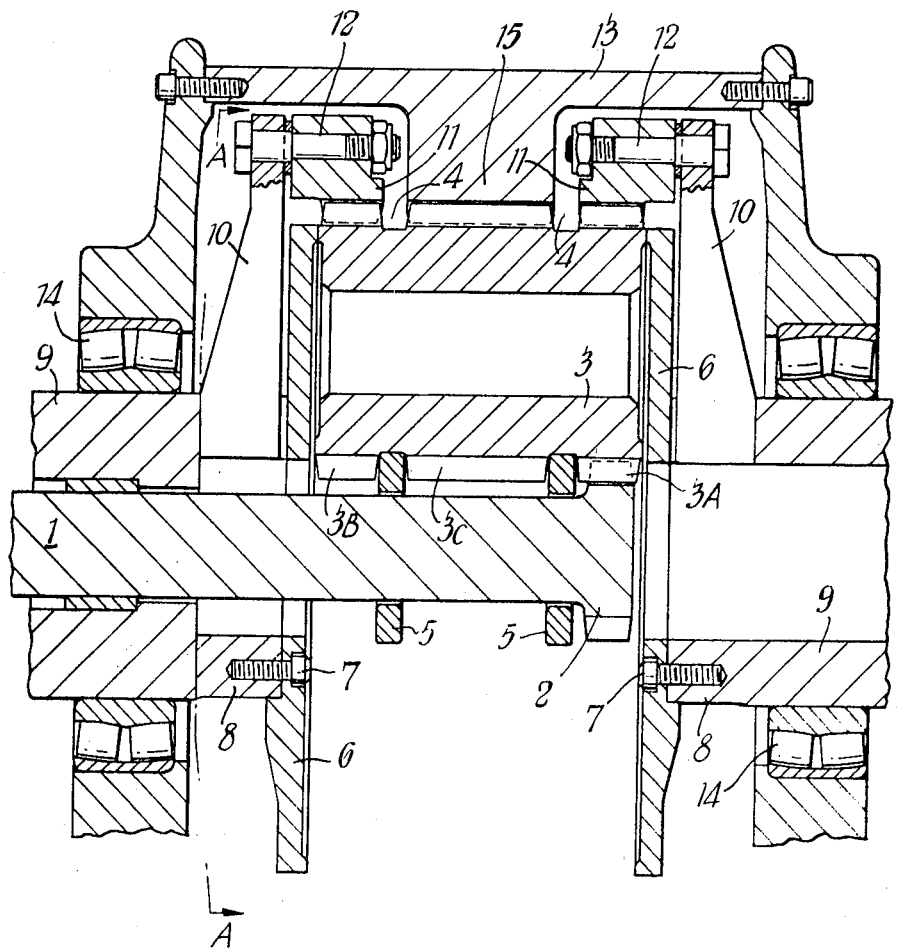
FIG. 1 is a part axial section of an epicyclic gear.
Figure 2:
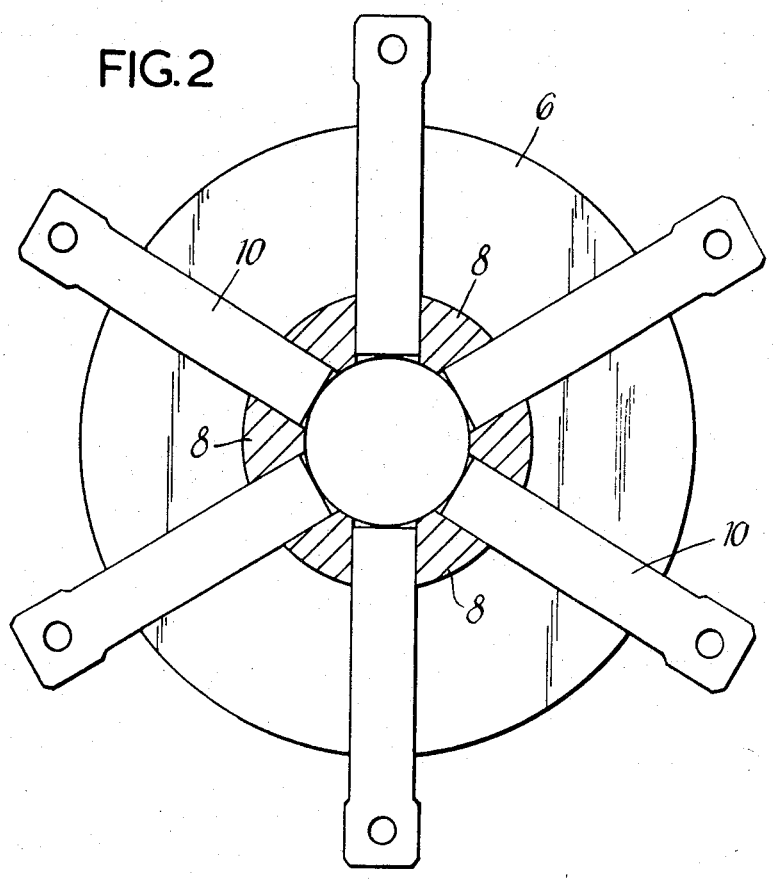
FIG. 2 is a section on the line A—A of FIG. 1 with some parts removed.

The epicyclic gear of FIG. 1 has an input shaft 1 with a sun wheel 2 integral therewith at one end. A plurality of planets 3, only one of which is shown, is arranged around the shaft 1, the planets meshing by their end toothed portions 3A with the sun wheel 2. The planets each have another end toothed portion 3B and a central toothed portion 3C, the latter being separated from the end portions by annular grooves 4. Two resilient flexible rings 5 surround the shaft 1 and enter the grooves 4 where the latter are adjacent the shaft 1. The rings 5 serve to press the planets radially outwards from the shaft 1. The planets 3 do not have a conventional carrier but are axially confined between two retaining discs 6 secured by screws 7 to axially extending fingers 8 of stationary reaction members 9. Radially extending flexible resilient fingers 10 are held, as shown in FIG. 2, at their inner ends between the fingers 8 of the reaction member 9, there being two sets of fingers 10, one at each axial end of the planets. An internally toothed ring 11 is secured by bolts 12 to the outer ends of the fingers of each set and the teeth of the rings 11 mesh with the end toothed portions 3A and 3B of the planets, which are thus "floating" but under both axial and radial restraint.

An output member 13 is journaled by bearings 14 on the reaction members 9 and has a central internally toothed annulus 15 which meshes with the central toothed portions 3C of the planets, the number of teeth on the annulus 15 differing from the number of teeth on the rings 11 by an amount that determines the reduction ratio. For reasons of ease of manufacture there are in this particular arrangement the same number of teeth on all three portions of the planets. However, in the general case, the number of teeth need not necessarily be the same. It will be seen that the annulus 15 and the rings 11 are in a balanced arrangement, being symmetrical with respect to the axial center of the planets with which they engage.

Figure 3:
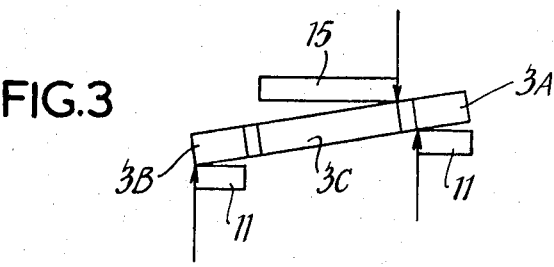
FIG. 3 is a diagrammatic radial view for illustrating forces on engaging teeth of the gear.

The flexible fingers 10 are preferably made of steel and arranged so that they are under constant bending stress when a load is being transmitted. Should a planet tend to skew a restoring couple will be applied and the planets will thus take up a position of uniform loading. The restoring forces are illustrated diagrammatically by the arrows in FIG. 3, where the skew of the planet is much exaggerated for clarity of the drawing.

It will be seen that with the construction described a massive carrier is no longer required, being replaced by two relatively light "spiders" of fingers and two annular rings which provide the reaction member for the planets.

I claim:

1. An epicyclic gear train comprising an annulus; a sun gear; a plurality of planet gears meshed therebetween; and a toothed reaction structure comprising an annular internally toothed ring on each side of said annulus coaxial with said annulus, each said ring engaging each of said planet gears, the planet gears being carrierless and floating in the gear train, and the engagement of the annulus and of the reaction structure with each planet gear being balanced and in the same radial plane through the axis of the epicyclic gear train; a spider of resilient flexible fingers for each said toothed ring; and a rigid mounting, said fingers radially extending from said mounting, said mounting supporting said rings so as to mount the reaction structure permitting the structure limited rotational movement about said axis.

2. A gear train as claimed in claim 1, wherein the portions of the planets that engage the annulus and the rings are divided by annular grooves and two resilient flexible rings, surrounding the shaft that carries the sun gear, enter said grooves where the latter are adjacent said shaft and press the planets radially outwards from said shaft.

3. A gear train as claimed in claim 1, wherein the portions of the planets that engage the annulus and the rings are uniformly toothed, the number of teeth on the annulus differing from the number of teeth on each ring.

* * * * *